United States Patent [19]

Carlson

[11] Patent Number: 4,554,585

[45] Date of Patent: Nov. 19, 1985

[54] SPATIAL PREFILTER FOR VARIABLE-RESOLUTION SAMPLED IMAGING SYSTEMS

[75] Inventor: Curtis R. Carlson, Princeton, N.J.

[73] Assignee: RCA Corporation, Princeton, N.J.

[21] Appl. No.: 522,692

[22] Filed: Aug. 12, 1983

[51] Int. Cl.[4] .............................................. H04N 5/30
[52] U.S. Cl. .................................... 358/209; 358/225
[58] Field of Search .............. 358/213, 212, 209, 225, 358/227, 217, 55; 250/578; 315/378, 382; 382/27, 67, 68

[56] References Cited

U.S. PATENT DOCUMENTS

| | | | |
|---|---|---|---|
| 4,028,725 | 6/1977 | Lewis | 358/103 |
| 4,061,914 | 12/1977 | Green | 250/578 |
| 4,100,570 | 7/1978 | Nobutoki et al. | 350/55 |
| 4,101,929 | 7/1978 | Ohneda et al. | 358/55 |
| 4,198,646 | 4/1980 | Alexander et al. | 357/24 LR |

Primary Examiner—Gene Z. Rubinson
Assistant Examiner—Stephen Brinich
Attorney, Agent, or Firm—Joseph S. Tripoli; George E. Haas; George J. Seligsohn

[57] ABSTRACT

Aliasing in detected image samples is substantially reduced by a spatial low-pass prefilter employing a diffusing surface variably spaced from an imager and situated in the path of projected image light to cause greater blurring in lower resolution regions of the imager than in higher resolution regions thereof, such that the cutoff spatial frequency varies continually in accordance with the variable resolution of the system.

6 Claims, 4 Drawing Figures

SPATIAL PREFILTER FOR VARIABLE-RESOLUTION SAMPLED IMAGING SYSTEMS

This invention relates to sampled imaging systems that have a spatial resolution capability that varies from one region of the image to another and, more particularly, to a low-pass prefilter for reducing aliasing in such a sampled imaging system.

Complex automatically controlled systems (such as robotic systems, target tracking systems, etc.) often require the signal processing of visual-information image samples. The total number of image samples to be processed depends both on the size of the field of view of the image and the spatial resolution of the image. In order to provide a high degree of spatial resolution over all of a large field of view requires an extremely large number of image samples. However, it is not practical to process such a large number of image samples.

One way of overcoming this problem (employed by the human eye) is to provide a relatively high spatial resolution in one region of the field of view of the imager (the centrally-located fovea of the retina of the eye) and a relatively low spatial resolution in another region of the field of view of the imager (the periphery of the retina of the eye)—together with the controlled movement of the imager to bring the spatial portion of an image originally within a low-resolution region of the imager into the high-resolution region of the imager. Thus, a person may move his eye and his head to observe with high resolution in the fovea an image of an object which was originally observed with low resolution near the edge of his visual field. This greatly reduces the number of image samples to be processed, while retaining the ability to observe objects with high spatial resolution, which imaged objects can originally fall anywhere within a relatively large field of view, most of which has only a low resolution capability.

As is known in sampling theory, the sampling of an information signal that contains frequency components that are higher than half the sampling frequency results in the samples defining spurious frequency components lower than half the sampling frequency (i.e., spurious frequency components are generated by the sampling process which are not present in the original unsampled information signal). This unwanted generation of spurious frequency components is known as aliasing. In order to eliminate, or at least substantially reduce, aliasing, it is necessary, prior to sampling, to pass the information signal through a lowpass prefilter having a cutoff frequency in the vicinity of half the sampling frequency. The result is that the portion of the original information signal that passes through the prefilter contains very little, if any, frequency components higher than half the sampling frequency, thereby substantially reducing aliasing. On the other hand, a prefilter cutoff frequency much below half the sampling frequency would result in the needless loss of useful information.

An image information signal is comprised of spatial frequency components. A spatial frequency low-pass prefilter is required to remove those image information signal frequency components higher than half the sampling frequency. In the imaging system with which the present invention is concerned, the sampling frequency from one region of the imager to another varies, being relatively high in a high-resolution and relatively low in a low-resolution region of the imager. The present invention is directed to a spatial-frequency low-pass prefilter having a cutoff frequency which varies spatially with variations in the spatial sampling frequency and, hence, the degree of resolution of the imaging system.

More specifically, the present invention is directed to the combination, in an imaging system, of an imager having a particular distribution pattern of discrete picture elements for detecting a light image projected thereon, with the spatial frequency low-pass prefilter being situated in the path of the projected light image for illuminating the imager with only the spatial frequencies of the projected image which pass through the prefilter. The particular spatial distribution pattern of the discrete picture elements of the imager is such that the respective sizes of the discrete picture elements in the pattern in at least one given dimension vary continuously from relatively the smallest in a first region of the pattern to relatively the largest in a second region of the pattern spaced from the first region thereof. This results in the derivation of a corresponding spatial pattern of image samples having relatively high spatial resolution in the first region, relatively low spatial resolution in the second region and a spatial resolution that varies continually from high to low in regions of the spatial pattern in between the first and second regions thereof. The prefilter is composed of a diffusing surface in spaced relationship with the pattern of picture elements of the imager, with the spacing distance between the diffusing surface and each of the picture elements of the pattern increasing as a direct function of the size of that picture element. This results in the spatial cutoff frequency of the prefilter varying in accordance with the spatial resolution of each region of image samples. The beneficial effect obtained is that aliasing in the variable-resolution sampled image detected by the imager is significantly reduced.

The term "scale invariant," as used herein, means that both object shape and object spatial resolution in a picture derived from a processed image of an object, are substantially independent of any magnification or de-magnification of object size in the image. In the drawing.

Figure 1:
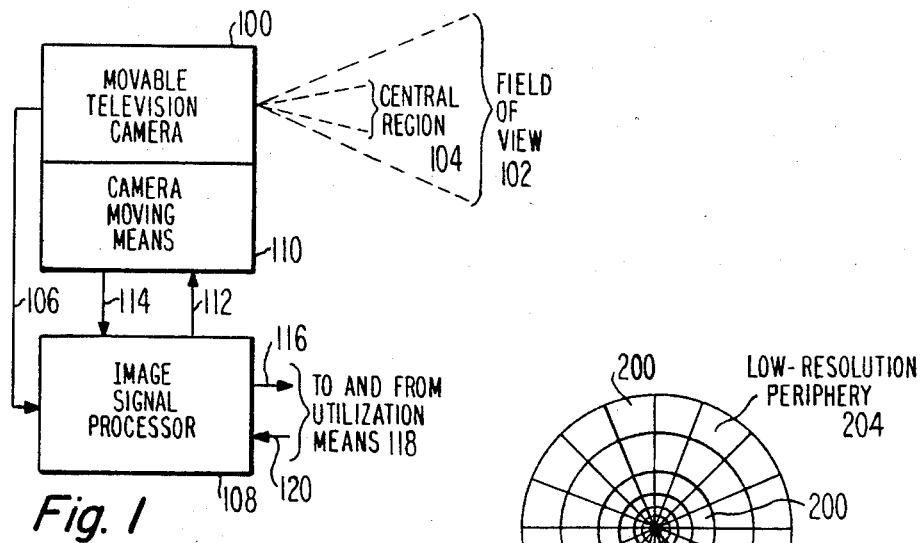
FIG. 1 is a functional block diagram of a typical imaging system that can make advantageous use of the present invention.

Referring to FIG. 1, there is shown an imaging system which constitutes the visual portion of a larger control system, such as a robotic system, a target tracking system, etc. For illustrative purposes in describing FIG. 1, it is assumed that the imaging system of FIG. 1 forms the visual portion of a robotic system.

Movable television camera 100 preferably includes a solid-state imager, such as a charge-coupled-device (CCD) imager. However, alternatively, movable television camera 100 can be comprised of a television camera tube such as a vidicon. In any case, movable television camera 100, in any position thereof, detects an image of a relatively wide filed of view 102 projected on the imager of movable television camera 100. This relatively wide field of view 102 includes a narrower central region 104. Movable television camera 100 produces a video signal output 106 corresponding to the imager of field of view 102, which video signal 106 is applied as a first input to image signal processor 108. Image signal processor 108 includes a computer and servo apparatus for analyzing input information applied thereto and generating command outputs therefrom.

Movable television camera 100 is mounted on camera moving means 110, which, in accordance with first command output signals 112 from image signal processor 108, moves movable television camera 100 toward a desired position determined by image signal processor 108. At the same time, camera moving means 110 feeds back, as a second input to image signal processor 108, input signals 114 defining the actual position of movable television camera 100 at any instant.

Image signal processor 108 applies second command output signals 116 to utilization means 118 (not shown). Utilization means 118 is assumed to be comprised of a signal-controlled mechanical robot arm supporting pincers for moving one or more objects situated within field of view 102 of movable television camera 100. Second output signals 116 constitute position command signals for controlling the movement and positioning of the mechanical robot arm and pincers. The actual position of the mechanical robot arm and pincers at any instant is defined by third input signals 120 from utilization means 118, which are fed back to image signal processor 108.

Image signal processor 108 has the job of (1) analyzing the image defined by video signal 106 to determine the exact whereabouts of a particular object in field of view 102 which is to be gripped and moved by the robot pincers; (2) providing the proper command position signals 116 to precisely and accurately move the robot arm and pincers to the particular object, grip the particular object, and (3) then precisely and accurately move the particular object to a certain preselected different position within field of view 102. This requires that television camera 100 be capable of observing the particular object with high spatial resolution despite the fact that particular object may be originally located anywhere within a relatively wide field of view 102. Image signal processor 108, which is preferably digital, requires that the spatial image information defined by video signal 106 be broken up into a spatial pattern of discrete picture-element image samples prior to signal processing. The amount of signal processing required increases at a geometric rate with the number of image samples to be processed. Therefore, to provide high spatial resolution over all of a wide field of view may not be practical.

In accordance with the principles of the present invention, relatively high spatial resolution is provided solely within the limited extent of central region 104 of field of view 102. Within those portions of field of view 102 falling outside of central region 104 only relatively low spatial resolution is provided. This greatly reduces the total number of samples to be processed, permitting a smaller, less-expensive, more practical signal processor 108 to be utilized, without affecting the ultimate spatial resolution capability of the imaging system.

More specifically, should image signal processor 108, in analyzing the image defined by video signal 106, determine that the position within field of view 102 of a particular object of interest is outside of central region 104 (so that the particular object is observed by camera 100 with only low spatial resolution), image signal processor 108 applies position command signals 112 to camera moving means 110. The result is that television camera 100 is moved to bring the particular object of interest into central region 104 (where it can be observed with high spatial resolution). Further, television camera 120 is moved to maintain the image of the particular object of interest within central region 104 while it is being moved to a new position by the robot arm of utilization means 118.

Although not limited thereto, the simplest way to provide variable-resolution image samples is to employ a solid-state imager chip, such as a CCD imaging chip, in movable television camera 100. In this case, the discrete physical picture elements on the chip are built to vary in size from one region to another in accordance with a given spatial distribution pattern. For example, each of FIGS. 2a and 2b is directed to a spatial distribution pattern which provides image samples that have a spatial resolution that is substantially scale-invariant in at least one dimension.

Figure 2A:
FIG. 2a illustrates the spatial distribution pattern of picture elements of an imager that has a resolution that is substantially scale invariant, with respect to the size of the image, in each of two dimensions.

In FIG. 2a, the discrete picture elements 200 are symmetrically disposed about the center of a polar-coordinate spatial distribution pattern. Thus, each discrete picture element 200, regardless of its position on the imager, occupies the same angular extent. However, the radial extent of each discrete picture element 200 increases substantially linearly from the high-resolution central region 202 of the spatial distribution pattern to the low-resolution periphery 204 of the spatial distribution pattern. Each individual discrete picture element 200 of the imager, regardless of its relative size, provides a single image sample. It is apparent from FIG. 2a that high-resolution central region 202 provides image samples of the highest spatial resolution, low-resolution periphery 204 provides image samples of the lowest spatial resolution, and that the spatial resolution provided by those picture elements 200 intermediate regions 202 and 204 is intermediate the spatial resolution provided by regions 202 and 204.

Figure 2B:
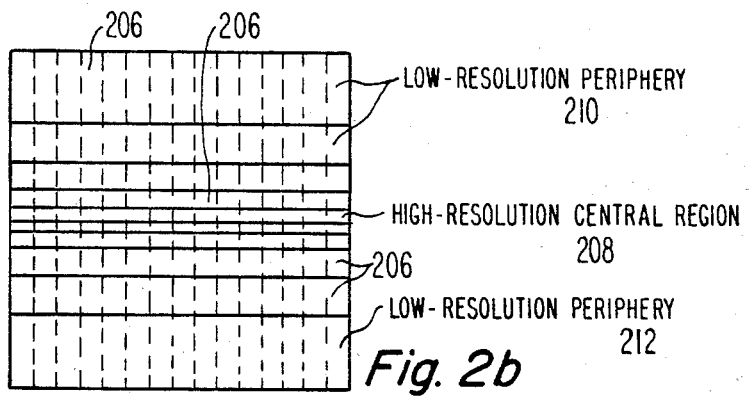
FIG. 2b illustrates the spatial distribution pattern of picture elements of an imager which is substantially scale invariant in solely one of two dimensions.

Alternatively, as shown in FIG. 2b, the imager may have a cartesian coordinate distribution pattern of picture elements 206, in which the discrete picture elements vary in size solely in one dimension, thereby providing substantially scale-invariant samples solely in this one dimension. The picture elements 206 in FIG. 2b vary in size in the vertical dimension and do not vary in size in the horizontal dimension. Further, the respective picture elements 206 in the upper half of the spatial distribution and in the lower half of the spatial distribution are symmetrically disposed about a horizontal axis to provide a high-resolution central region 208 that is surrounded by low resolution periphery regions 210 and 212.

The respective substantially scale-invariant spatial distribution patterns shown in FIGS. 2a and 2b are meant only as examples. Any imager having a spatial distribution pattern of discrete picture elements for detecting a light image projected thereon, in which the respective sizes of the discrete picture elements of the pattern, in at least one given dimension, vary continually from relatively the smallest in a first region of the pattern to relatively the largest in the second region of the pattern spaced from the first region thereof, is contemplated by the present invention. Furthermore, the spatial distribution pattern of discrete picture elements can be derived directly, as in FIGS. 2a and 2b, in which each picture element is comprised of a single photodetecting element of a solid-state imager. Alternatively, this pattern can be realized indirectly by means of appropriate integrating circuitry operating on a photodetecting signal derived from different subareas of the photodetecting surface. In the latter case, either a continuous photodetecting surface of a vidicon or a solid-state imaging chip having photodetectors all of the same size, the size being equal to or smaller than the size of the highest resolution image sample of the spatial distribution pattern to be realized.

Figure 3:
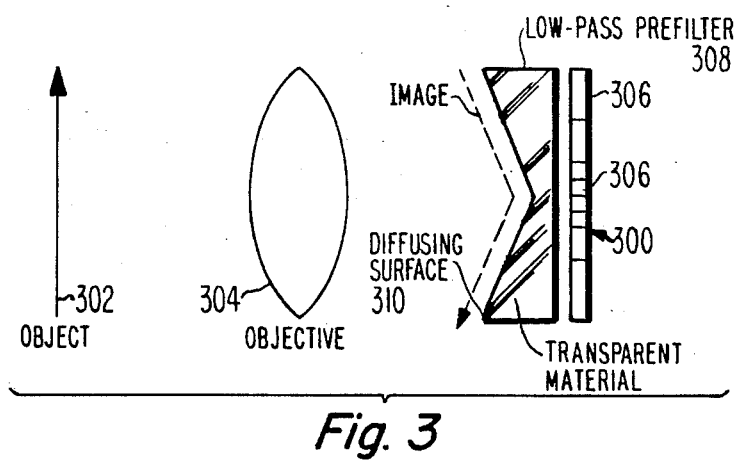
FIG. 3 illustrates the imaging of an object on a substantially scale-invariant imager through a low-pass prefilter incorporating the principles of the present invention.

Referring to FIG. 3, there is shown an imager 300 having a substantially scale-invariant spatial distribution pattern of discrete picture elements similar to that shown in either FIG. 2a or FIG. 2b. Object 302 (such as a scene observed by movable television camera 100 within field of view 102) is imaged by objective lens 304 of the television camera onto imager 300. Object 302 includes high-resolution spatial information which, if directly imaged on imager 300, would have high spatial frequency components that are beyond the resolution capability of at least some of variable-size picture elements 306 on imagar 300. This would result in the introduction of spurious aliasing signal components in the image sample signal detected by imager 300. However, the presence of low-pass spatial frequency prefilter 308 situated, as shown, in front of imager 300 in the path of the imaging light from objective 304, is effective in removing (or at least substantially reducing) any such high spatial frequency components before the image light is incident on imager 300. Therefore, aliasing is eliminated (or at least substantially reduced).

As indicated in FIG. 3, low-pass prefilter 308 includes a diffusing surface 310 situated in spaced relationship with respect to the pattern of picture element 306 of imager 300, with the spacing distance between diffusing surface 310 and each picture element 306 of the pattern increasing as a direct function of the size of that picture element. The effect is to vary the spatial cutoff frequency of the prefilter 308 in accordance with the spatial resolution of each region of image samples. In particular, the relatively small distance between diffusing surface 310 and the high-resolution central region of imager 300 results in a relatively small amount of blurring occurring in the portion of the image light detected by the picture elements 306 of the high-resolution central region (so that low-pass prefilter 308 exhibits a relatively high cutoff frequency in the vicinity of the high-resolution central region of imager 300). However, the relatively large distance between diffusing surface 310 of low-pass prefilter 308 and imager 300 in the vicinity of the low resolution periphery of imager 300 results in a relatively large amount of blurring of the image light incident on the picture elements of the low-resolution periphery of imager 300. Therefore, the spatial cutoff frequency of low-pass prefilter 308 in the vicinity of the low-resolution periphery of imager 300 is relatively low. Thus, low-pass prefilter 308 operates as a spatial low-pass prefilter having a spatial cutoff frequency which varies continually from one region thereof to another. The specific case shown in FIG. 3, in which the spatial distribution pattern of discrete picture elements of imager 300 is assumed to be either the substantially scale-invariant distribution pattern of FIG. 2a or that of FIG. 2b, the distance between the diffusing surface 310 and imager 300 varies linearly from the axis of symmetry of imager 300 through the high-resolution central region thereof to the periphery thereof. The amount of blurring provided by diffusing surface 310 is proportional to the slope of diffusing surface 310 with respect to the plane of imager 300. Appropriate selection of this slope and appropriate determination of the diffusive properties of diffusing surface 310, permits the spatial cutoff frequency characteristics of low-pass prefilter 308 to be achieved which minimize aliasing, without needless loss of resolution.

Physically, low-pass prefilter 308 can be comprised of a solid transparent material, such as glass, plastic etc. In the case of a polar-coordinate spatial distribution pattern of the type shown in FIG. 2a, diffusing surface 310 of the solid transparent material forming low-pass prefilter 308 is a conical surface having its apex in cooperative spaced relationship with the center of the polar-coordinate picture-element spatial distribution pattern of imager 300. In the case of a one-dimensional Cartesian coordinate spatial distribution pattern of the type shown in FIG. 2b, the solid transparent material of low-pass prefilter 308 can be comprised of two similar wedge-shaped members disposed on opposite sides of the axis of symmetry of the picture-element spatial distribution pattern of imager 300.

Alternatively, low-pass prefilter 308 may not be comprised of solid material. Instead, diffusing surface 310 can be a surface of sheet material, which sheet material is properly supported in cooperative spaced relationship with imager 300. In this case, the space between the sheet material and imager 300 is air. Use of sheet material is more practical for the spatial distribution shown in FIG. 2b than that shown in FIG. 2a. In the case of a spatial distribution pattern conforming to that shown in FIG. 2b, sheet material incorporating the diffusing surface 310 can be comprised of two plates of glass disposed respectively on opposite sides of the axis of symmetry of imager 300, each of the sheets being inclined at a given angle with respect to the plane of imager 300.

What is claimed is:

1. In an imaging system, the combination comprising:

an imager having a spatial distribution pattern of discrete picture elements for detecting a light image projected thereon, wherein the respective sizes of said discrete picture elements in said pattern in at least one given dimension vary continually from relatively the smallest in a first region of said pattern to relatively the largest in a second region of said pattern spaced from said first region thereof, thereby to derive a corresponding spatial pattern of image samples having relatively high spatial resolution in said first region, relatively low spatial resolution in said second region and a spatial resolution that varies continually from high to low in regions of said spatial pattern in between first and second regions thereof; and a spatial frequency low-pass prefilter situated in the path of said projected light image for illuminating said imager with only the spatial frequencies of said projected image which pass through said prefilter, said prefilter being comprised of a diffusing surface in spaced relationship with respect to said pattern of picture elements of said imager with the spacing distance between said diffusing surface and each of said picture elements of said pattern increasing as a direct function of the size of that picture element, thereby to vary the spatial cutoff frequency of said prefilter in accordance with the spatial resolution of each region of image samples, whereby aliasing in the variable resolution sampled image detected by said imager is significantly reduced.

2. The combination defined in claim 1, wherein:

said distribution pattern is such as to provide substantially scale-invariant image samples at least in said one given dimension; and said spacing distance in said one dimension increases as substantially a linear function of the variation in size of said discrete picture elements in said one given dimension.

3. The combination defined in claim 2, wherein:

said distribution pattern in such as to provide substantially scale-invariant image samples in each of two given dimensions; and said spacing distance in each of said two given dimensions increases as substantially a linear function of the variation in size of said picture elements in that given dimension.

4. The combination defined in claim 3, wherein:

said distribution pattern is a polar coordinate distribution pattern; and said diffusing surface of said prefilter comprises a conical surface having an apex, said conical surface being disposed in spaced relationship with said imager with its apex being situated in closer proximity to said first region of said imager than any other region of said imager.

5. The combination as defined in claim 2, wherein:

said distribution pattern is such as to provide substantially scale-invariant image samples solely in said one given dimension; and said diffusing surface comprises a plane diffusing surface of at least one wedge-shaped member disposed in cooperative spaced relationship with said imager, said plane diffusing surface being inclined at a given angle with respect to said imager such that the spacing distance between said first region and said plane diffusing surface is less than the spacing distance between said second region and said plane surface.

6. The combination defined in claim 5, wherein:

said substantially scale-invariant distribution in said one given dimension is symmetrical about a given axis of symmetry of said imager that is oriented normal to said one given dimension, said given symmetry axis dividing said imager into first and second symmetric sections disposed on opposite sides of said axis with each of said sections including (1) a first region for deriving a spatial pattern of image samples having said relatively high spatial resolution and (2) a second region for deriving a spatial pattern having said relatively low spatial resolution, said first region of each of said first and second symmetric sections being situated closer to said axis than said second region of each of said first and second sections; and said diffusing surface comprises a plane diffusing surface of each of first and second similar wedge-shaped members disposed on opposite sides of said axis, whereby said first wedge-shaped member is in cooperative spatial relationship with said first section and said second wedge-shaped member is in cooperative spatial relationship with said second section, and said plane diffusing surface of each of said first and second wedge-shaped members is inclined at a given angle with respect to said imager such that the spacing distance between the first region of that section with which that wedge-shaped member is in cooperative spatial relationship and said plane diffusing surface of that wedge-shaped member is less than the spacing distance between the second region of that section and said plane diffusing surface of that wedge-shaped member.

* * * * *